(12) United States Patent
Chou

(10) Patent No.: US 11,811,351 B2
(45) Date of Patent: Nov. 7, 2023

(54) MOTOR CONTROLLER

(71) Applicant: FANUC CORPORATION, Yamanashi (JP)

(72) Inventor: Norihiro Chou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 230 days.

(21) Appl. No.: 16/879,765

(22) Filed: May 21, 2020

(65) Prior Publication Data

US 2020/0382025 A1 Dec. 3, 2020

(30) Foreign Application Priority Data

May 28, 2019 (JP) .................................. 2019-099396

(51) Int. Cl.
*H02P 3/18* (2006.01)
*H02P 27/04* (2016.01)
*H02K 11/33* (2016.01)
*H02K 11/00* (2016.01)
*H02M 7/06* (2006.01)

(52) U.S. Cl.
CPC ............ *H02P 3/18* (2013.01); *H02K 11/0094* (2013.01); *H02K 11/33* (2016.01); *H02P 27/04* (2013.01); *H02M 7/06* (2013.01)

(58) Field of Classification Search
CPC ... H02P 3/18; H02P 27/04; H02P 3/22; H02K 11/0094; H02K 11/33; H02M 7/06; H02M 1/32; H02M 5/458; H02M 7/003
See application file for complete search history.

(56) References Cited

U.S. PATENT DOCUMENTS

| | | | | |
|---|---|---|---|---|
| 2003/0094920 | A1* | 5/2003 | Numaguchi | H02K 11/33 318/801 |
| 2014/0070751 | A1* | 3/2014 | Niwa | H02P 27/04 318/494 |
| 2015/0357886 | A1* | 12/2015 | Ishizeki | F04C 11/008 310/71 |

FOREIGN PATENT DOCUMENTS

| | | |
|---|---|---|
| JP | S54-52732 U | 4/1979 |
| JP | S54-79912 U | 6/1979 |
| JP | H5-276774 A | 10/1993 |
| JP | 2003164112 A | 6/2003 |
| JP | 2007-335126 A | 12/2007 |
| JP | 2007335126 A * | 12/2007 |
| JP | 2008-271619 A | 11/2008 |
| JP | 2017-221003 A | 12/2017 |
| JP | 2019-60274 A | 4/2019 |
| WO | 2016/194097 A1 | 12/2016 |

* cited by examiner

*Primary Examiner* — Muhammad S Islam
*Assistant Examiner* — Bradley R Brown
(74) *Attorney, Agent, or Firm* — HAUPTMAN HAM, LLP

(57) ABSTRACT

A motor controller includes a motor drive unit configured to drive and control a motor, an electrical discharge control unit configured to perform control in which regenerative power from the motor is consumed by a regenerative power discharge resistor, and a housing formed to accommodate the motor drive unit and the electrical discharge control unit, wherein at least a part of the housing is configured as the regenerative power discharge resistor.

9 Claims, 4 Drawing Sheets

MOTOR CONTROLLER

RELATED APPLICATIONS

The present application claims priority to Japanese Application Number 2019-099396, filed May 28, 2019, the disclosure of which is hereby incorporated by reference herein in its entirety.

BACKGROUND OF THE INVENTION

1. Field of the Invention

The present invention relates to a motor controller.

2. Description of Related Art

Conventionally, in machine tools, industrial machines, etc., a motor is mounted, and a motor controller for controlling such a motor is used. Motor controllers have a regenerative power discharge resistor for consuming electrical power regenerated when the motor decelerates or stops. Japanese Unexamined Patent Publication (Kokai) No. JP05-276774A describes a servo controller in which an external regenerative power discharge resistor and an internal regenerative power discharge resistor in a servo control device body are connected in series or parallel.

SUMMARY OF THE INVENTION

A regenerative power discharge resistor is generally attached to the exterior of a housing of a motor controller or arranged in the interior of the housing. In this case, it is necessary to secure a dedicated space for arrangement of the regenerative power discharge resistor in the exterior of the housing or the interior of the housing.

An aspect of the present disclosure provides a motor controller comprising a motor drive unit configured to drive and control a motor, an electrical discharge control unit configured to perform control in which regenerative power from the motor is consumed by a regenerative power discharge resistor, and a housing formed to accommodate the motor drive unit and the electrical discharge control unit, wherein at least a part of the housing is configured as the regenerative power discharge resistor.

BRIEF DESCRIPTION OF THE DRAWINGS

The object, characteristics, and advantages of the present invention will be elucidated by the descriptions of the embodiments below in association with the attached drawings. In the drawings.

DETAILED DESCRIPTION

Figure 1:
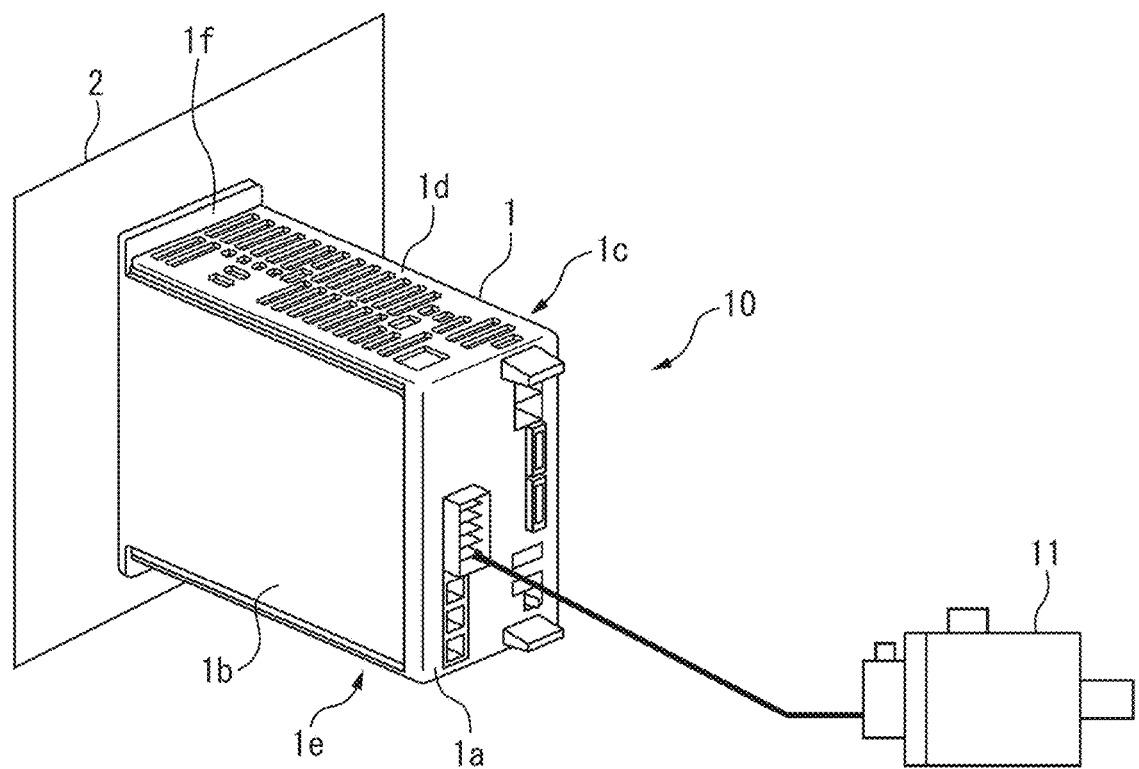
FIG. 1 is a perspective view showing an outer appearance of a motor controller according to an embodiment.

The embodiments of the present disclosure will be described below with reference to the attached drawings. In the drawings, corresponding constituent elements have been assigned common reference signs. In order to facilitate understanding, the scales of the drawings have been appropriately changed. Furthermore, the forms shown in the drawings are merely examples for carrying out the invention. The invention is not limited to the illustrated forms.

FIG. 1 is a perspective view showing an outer appearance of a motor controller 10 according to an embodiment. The motor controller 10 is a device for driving and controlling a motor 11, and printed circuit boards on which the circuitry of a motor control unit 12 and a motor drive unit 3 is mounted are accommodated in a housing 1 (refer to FIG. 3). Various connectors including a connector for connection with the motor 11 are arranged on a front wall part 1*a* of the housing 1. The motor 11 is connected to the motor controller 10 via a connector arranged on the front wall part 1*a*. The housing 1 includes the front wall part 1*a*, a left wall part 1*b*, a right wall part 1*c*, an upper wall part 1*d*, a lower wall part 1*e*, and a rear wall part 1*f*. The rear wall part if of the housing 1 is configured as an attachment plate for attaching the motor controller 10 to a control panel 2.

Figure 2:
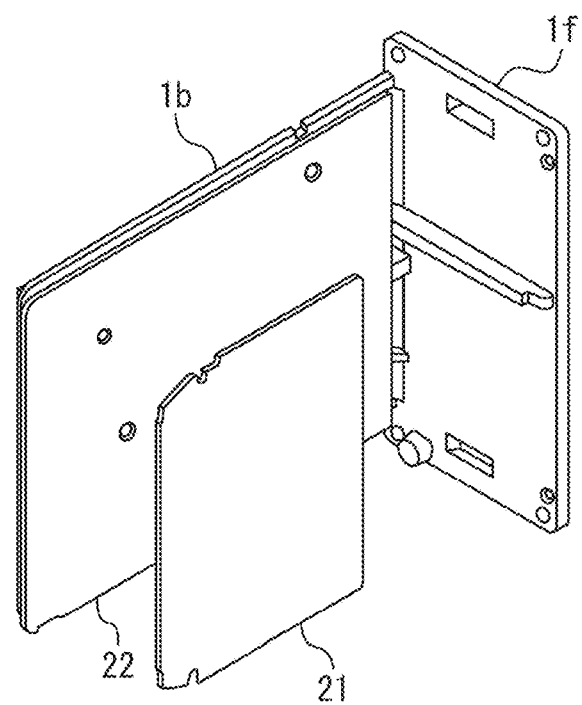
FIG. 2 is a perspective view showing the inner structure of the motor controller.

FIG. 2 is a perspective view showing the inner structure of the motor controller 10. Note that in FIG. 2, in order to show the inner structure, only the rear wall part if and the left wall part 1*b* of the wall surfaces constituting the housing 1 are illustrated, and the others are omitted. As shown in FIG. 2, printed circuit boards 21 and 22 on which there are mounted various circuit components for driving the motor are accommodated in the interior of the motor controller 10. Circuit components constituting the motor control unit 12 are mounted on the printed circuit board 21 and circuit components constituting the motor drive unit 3 are mounted on the printed circuit board 22 (refer to FIG. 3).

Figure 3:
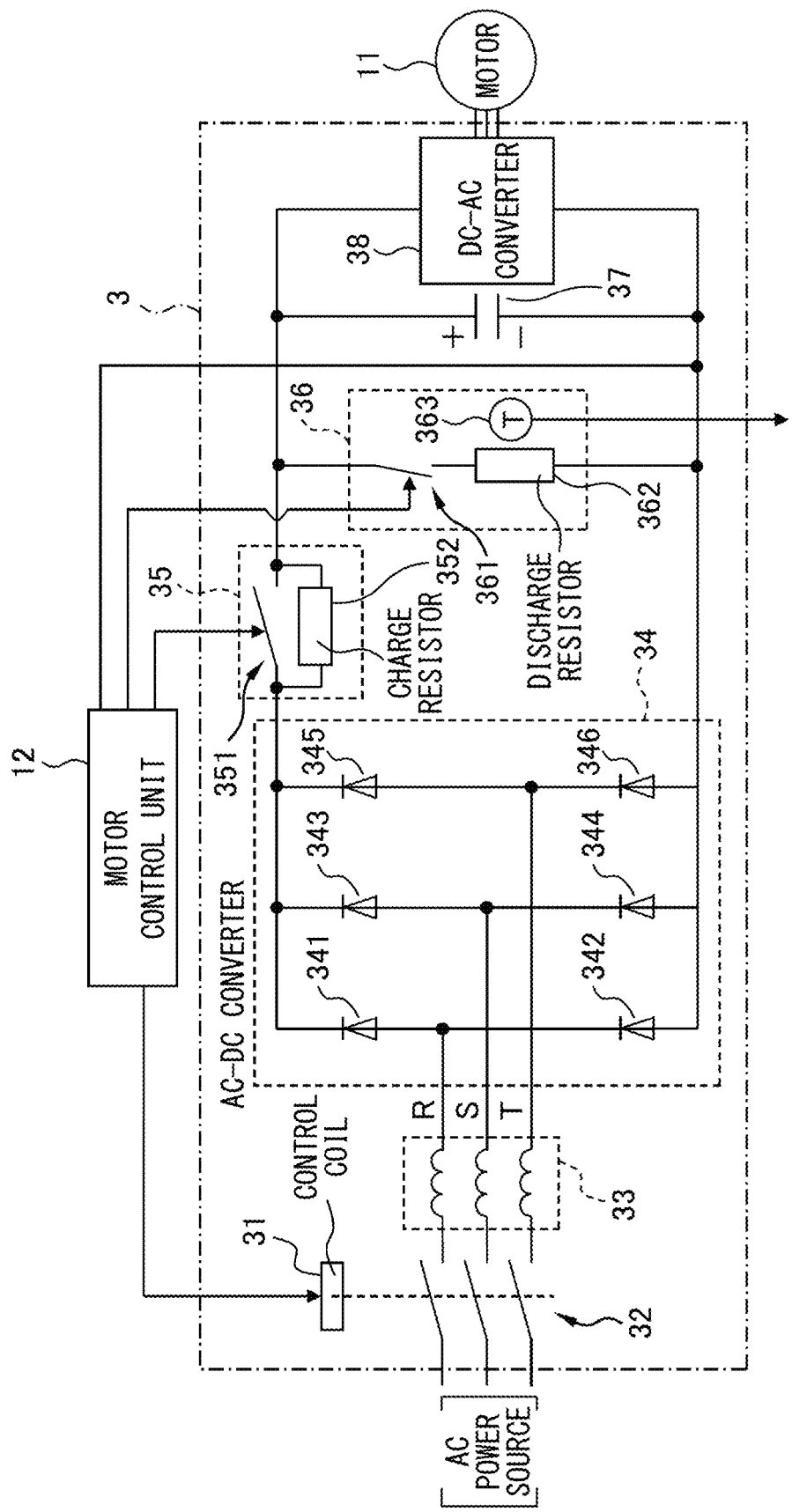
FIG. 3 is a block diagram showing an example of a circuit configuration of a motor drive unit of the motor controller.

FIG. 3 is a block diagram showing an example of the circuit configuration of the motor drive unit 3 of the motor controller 10 shown in FIG. 1. As shown in FIG. 3, the motor drive unit 3 drives and controls the motor 11 based on control signals from the motor control unit 12. The motor drive unit 3 includes a control coil 31, an electromagnetic contactor 32, a reactor (three-phase reactor) 33, an AC-DC converter 34, a charge control unit 35, an electrical discharge control unit 36, a DC link capacitor 37, and a DC-AC converter 38.

The control coil 31 performs on (connected)/off (disconnected) control of the electromagnetic contactor 32 based on an electromagnetic contactor open/close command from the motor control unit 12. AC voltage from an AC source (e.g., a three-phase AC source) is applied to the AC-DC converter 34 via the reactor (three-phase reactor) 33 by the electromagnetic contactor 32 in a connected state and is converted to DC (pulsating) voltage. The three-phase reactor 33 is provided on the primary side (AC source side) of the motor drive unit (inverter) 3, and is used for improving the power factor (measures against higher harmonic waves) and reducing a surge from the power supply. The AC-DC converter 34 includes rectifying diodes 341, 342, 343, 344, 345, and 346 provided for the three respective phases (R-phase, S-phase and T-phase) input via the three-phase reactor 33.

The DC voltage which has been AC-DC converted by the AC-DC converter 34 is smoothed by the DC link capacitor 37 via the charge control unit 35. The smoothed DC voltage is converted to AC voltage (e.g., three-phase AC voltage) by the DC-AC converter 38 in order to drive the motor 11. The electrical discharge control unit 36 is provided in parallel between both ends of the DC link capacitor 37. Both ends of the DC link capacitor 37 are also connected to the motor control unit 12, whereby, for example, the voltage (DC link voltage) between the both ends of the DC link capacitor 37 can be detected by the motor control unit 12.

The charge control unit 35 includes a charge resistor 352 and a switch 351 which is provided in parallel with the charge resistor 352. The switch 351 performs on/off control based on a short circuit command from the motor control unit 12. The charge control unit 35 is configured such that, for example, in the charging after the DC link capacitor 37 has completely electrically discharged, the switch 351 is turned off, and the charge resistor 352 is inserted in series, so as to prevent a large current from flowing.

The electrical discharge control unit 36 includes a regenerative power discharge resistor 362 and a switch 361 provided in series with respect to the regenerative power discharge resistor 362. Note that, as described later, in the present embodiment, at least a part of the housing 1 is configured as the regenerative power discharge resistor 362. The switch 361 performs on/off control based on an electrical discharge command from the motor control unit 12. The electrical discharge control unit 36 may include a temperature detector 363 for detecting the temperature of the regenerative power discharge resistor 362. In this case, the temperature of the regenerative power discharge resistor 362 detected by the temperature detector 363 may be monitored by the motor control unit 12.

The motor control unit 12 can determine the time (resistor regeneration time) for the regenerative power to be consumed by the regenerative power discharge resistor 362 as well as the regenerative power (resistor regeneration amount) consumed by the regenerative power discharge resistor 362 based on the electrical discharge command (the timing at which the on/off control of the switch 361 is performed) for controlling the switch 361 of the electrical discharge control unit 36, the change in the detected DC link voltage, etc.

Note that, based on a resistor regeneration start voltage set in the motor control unit 12, the switch 361 of the electrical discharge control unit 36 is turned on (connected) to apply the DC link voltage to the regenerative power discharge resistor 362 for it to consume the regenerative power. Furthermore, the turning off (disconnection) of the switch 361 of the electrical discharge control unit 36 to cut off the regenerative power discharge resistor 362 is performed based on a resistor regeneration stop voltage. In other words, the starting of electrical discharge and the stopping of electrical discharge by the regenerative power discharge resistor 362 provided in parallel with the DC link capacitor 37 is controlled in accordance with the resistor regeneration start voltage and the resistor regeneration stop voltage.

Specifically, when the DC link voltage becomes higher than the resistor regeneration start voltage, the switch 361 of the electrical discharge control unit 36 is turned on and regeneration (resistor regeneration) by the regenerative power discharge resistor 362 starts. When the DC link voltage becomes lower than the resistor regeneration stop voltage, the switch 361 of the electrical discharge control unit 36 is turned off and regeneration by the regenerative power discharge resistor 362 stops. As a result, breaking of, for example, the DC link capacitor 37, the AC-DC converter 34, the DC-AC converter 38, etc., can be prevented.

For example, in the configuration shown in FIG. 3, when the motor 11 decelerates, regenerative power is generated, and the DC link voltage (the voltage of the DC link capacitor 37) increases. At this time, if the DC link voltage increases excessively, for example, a DC link overvoltage alarm is output from the motor control unit 12 which detects the DC link voltage, and overvoltage breakdown occurs due to the DC link voltage exceeding the withstand voltage of the motor drive unit 3 (the DC link capacitor 37, the AC-DC converter 34, the DC-AC converter 38, etc.), whereby a system will stop. In order to prevent the system from stopping, the regenerative power is consumed by the regenerative power discharge resistor 362 so that the DC link voltage does not excessively increase.

In the motor controller 10 according to the present embodiment, a part or the entirety of the housing 1 is configured as the regenerative power discharge resistor 362, whereby space savings can be achieved by the entire motor controller 10.

Figure 4:
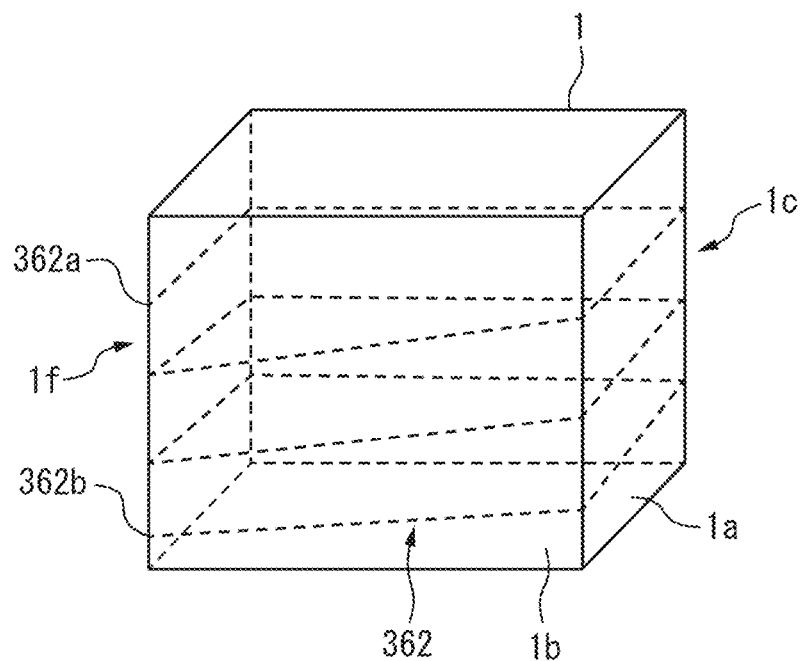
FIG. 4 is a view showing a first configuration example in which a housing is configured as a regenerative power discharge resistor.

FIG. 4 shows a first configuration example in which the housing 1 is configured as the regenerative power discharge resistor 362. In the configuration example of FIG. 4, the four wall surfaces (the left wall part 1b, the right wall part 1c, the front wall part 1a, and the rear wall part if in the example of FIG. 4) forming the square tube-like peripheral surface of the box-like housing 1 are configured as the regenerative power discharge resistor 362. In the present configuration example, a resistive element forming the regenerative power discharge resistor 362 is disposed integrally with the four wall surfaces of the square tube-like housing while being wound around the four wall surfaces. Two ends 362a and 362b of the resistive element forming the regenerative power discharge resistor 362 are connected to the electrical discharge control unit 36 on the printed circuit board 22 by connection cables (not illustrated). The resistive element forming the regenerative power discharge resistor 362 is integrated with the wall surfaces, for example, by being embedded in each wall surface.

Figure 5:
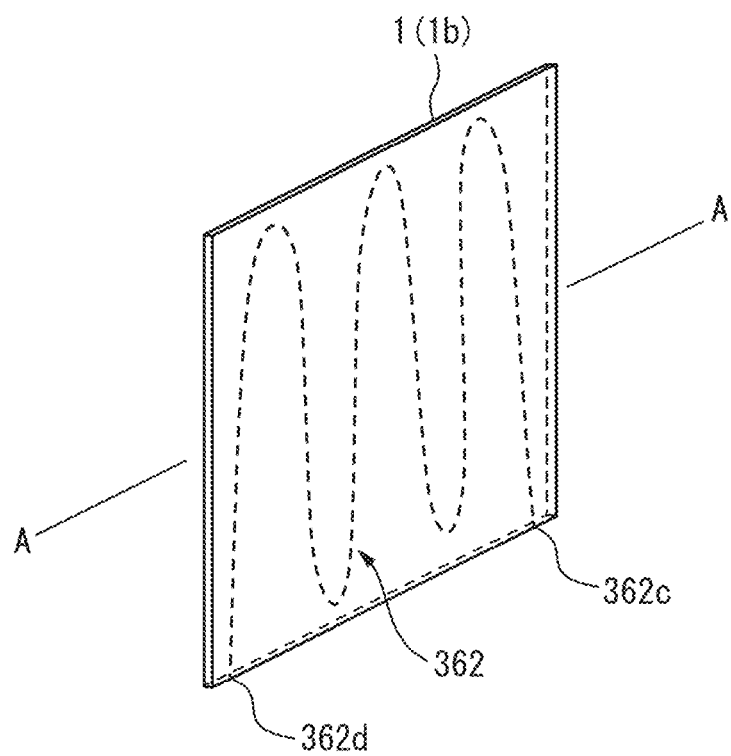
FIG. 5 is a view showing a second configuration example in which a housing is configured as a regenerative power discharge resistor.

FIG. 5 shows a second configuration example in which the housing 1 is configured as the regenerative power discharge resistor 362. In the configuration example of FIG. 5, one wall surface (the left wall part 1b in the example of FIG. 5) of the housing 1 is configured as the regenerative power discharge resistor 362. In the present configuration example, a resistive element constituting the regenerative power discharge resistor 362 is disposed on the left wall part 1b in a curved zig-zagging pattern. The two ends 362c and 362d of the resistive element forming the regenerative power discharge resistor 362 are connected to the electrical discharge control unit 36 on the printed circuit board 22 by connection cables (not illustrated). The resistive element forming the regenerative power discharge resistor 362 is integrated with the side wall by being embedded, for example, in the left wall part 1b.

The configurations of the regenerative power discharge resistor 362 shown in FIGS. 4 and 5 are examples, and a structure in which the regenerative power discharge resistor 362 is arranged in a part of the wall surface of the housing or in the entire wall surface of the housing 1 can be realized. For example, the rear wall part if serving as an attachment plate may be configured as the regenerative power discharge resistor 362 as in the configuration illustrated in FIG. 5. Alternatively, all of the six wall surfaces constituting the housing 1 may be configured as the regenerative power discharge resistor 362.

Figure 6A:
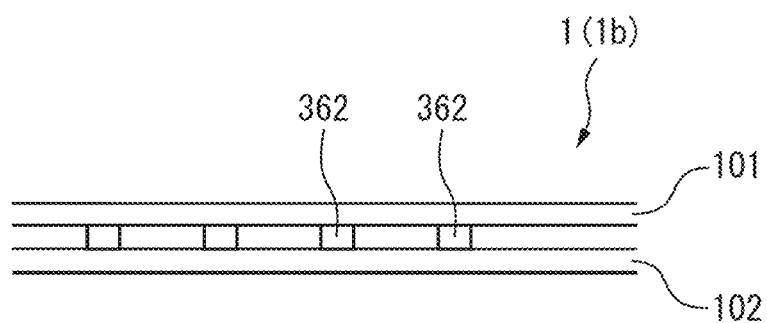
FIG. 6A is a cross-sectional view showing an example of an internal structure of a wall surface of a housing configured as a regenerative power discharge resistor.
Figure 6B:
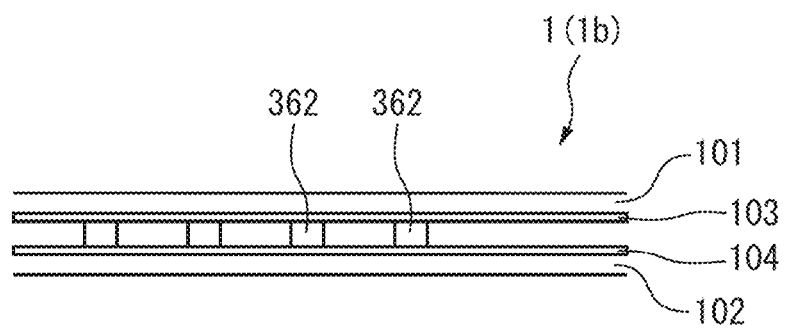
FIG. 6B is a cross-sectional view showing another example of an internal structure of a wall surface of a housing configured as a regenerative power discharge resistor.

FIGS. 6A and 6B are cross-sectional views showing examples of internal structures of the wall surface of the housing 1 configured as the regenerative power discharge resistor 362. FIGS. 6A and 6B show cross-sectional structures of the left wall part 1b taken along line A-A in FIG. 5. In the example of the cross-sectional structure shown in FIG. 6A, the resistive element constituting the regenerative power discharge resistor 362 is interposed between an outer layer 101 forming the outer surface of the housing 1 and an inner layer 102 forming the inner surface of the housing 1 in the left wall part 1b. In this configuration example, each of the outer layer 101 and the inner layer 102 is constituted by an insulating member, such as resin, ceramic, etc.

In the case in which the outer layer 101 and the inner layer 102 are constituted by metal members, insulating layers 103, 104 are interposed between the outer layer 101 and the resistive element, as well as between the inner layer 102 and the resistive element, respectively, as in the configuration example shown in FIG. 6B. The insulating layers 103, 104 can be formed of, for example, mica. Note that in the configuration example of FIG. 6B, when a metal member is used as the outer layer 101, the inner layer 102 may be constituted by another member (resin, ceramic, etc.). Note that in this case, the inner layer 102 may be omitted. By forming at least the outer layer 101 from a metal member, a part or the entirety of the housing 1 can serve as the regenerative power discharge resistor and a heat radiator for internal heat sources.

Since the rear wall part 1f of the housing 1 is a portion serving as an attachment plate arranged in the back side of the motor controller 10, design for integrally attaching a heat radiator to the rear wall part 1f is comparatively easy. Thus, integrally attaching a heat radiator to the rear wall part 1f and configuring the rear wall part 1f or a plurality of wall surfaces including the rear wall part 1f to be the regenerative power discharge resistor 362 can be an advantageous configuration with regard to heat dissipation.

In the present embodiment, by configuring at least a part of the housing as the regenerative power discharge resistor, space savings for the motor controller can be realized. Further, by configuring at least a part of the housing as the regenerative power discharge resistor, the degree of freedom in the design of the regenerative power discharge resistor 362, such as, design of the length and the volume of the regenerative power discharge resistor, can be increased. According to the present embodiment, since a large length and a large volume of the regenerative power discharge resistor can be ensured, the energy consumption of the regenerative power discharge resistor can be increased.

Though the embodiments of the present disclosure have been described above, a person skilled in the art would understand that various modifications and changes can be made without deviating from the scope disclosed in the claims described below.

Though the housing of the motor controller has a box-like shape in the embodiments described above, this shape is merely an example, and the housing can have various shapes. In this case, the same advantageous effects as those of the embodiments described above can be achieved by configuring at least a part of the housing as the regenerative power discharge resistor.

The invention claimed is:
1. A motor controller, comprising:
a motor drive unit configured to drive and control a motor;
an electrical discharge control unit configured to perform control in which regenerative power from the motor is consumed by a regenerative power discharge resistor; and
a housing formed to accommodate the motor drive unit and the electrical discharge control unit, wherein
an entire surface of the housing is configured as the regenerative power discharge resistor, and
a resistive element forming the regenerative power discharge resistor is embedded in peripheral walls of the housing.

2. The motor controller according to claim 1, wherein the housing includes an outer layer and an inner layer, and the resistive element forming the regenerative power discharge resistor is disposed between the outer layer and the inner layer.

3. The motor controller according to claim 1, wherein the housing has wall surfaces connected into a tubular structure, and the resistive element is wound around the wall surfaces of the housing.

4. The motor controller according to claim 1, wherein at least a part of the housing is constituted by an insulating member.

5. The motor controller according to claim 1, wherein the regenerative power discharge resistor comprises two ends connected to the electrical discharge control unit.

6. The motor controller according to claim 1, wherein the housing is formed in a tubular shape having the peripheral walls, and the resistive element forming the regenerative power discharge resistor is wound around the peripheral walls of the housing and is disposed integrally with the peripheral walls.

7. The motor controller according to claim 1, wherein the resistive element forming the regenerative power discharge resistor is wound around at least two of the peripheral walls of the housing.

8. A motor controller, comprising:
a motor drive unit configured to drive and control a motor;
an electrical discharge control unit configured to perform control in which regenerative power from the motor is consumed by a regenerative power discharge resistor; and
a housing formed to accommodate the motor drive unit and the electrical discharge control unit,
wherein
at least a part of the housing is configured as the regenerative power discharge resistor,
the housing is formed in a box-like shape, and
a resistive element forming the regenerative power discharge resistor is wound around four wall surfaces forming a square tube-like peripheral surface of the housing and is disposed integrally with the four wall surfaces.

9. A motor controller, comprising:
a motor drive unit configured to drive and control a motor;
an electrical discharge control unit configured to perform control in which regenerative power from the motor is consumed by a regenerative power discharge resistor; and
a housing formed to accommodate the motor drive unit and the electrical discharge control unit,
wherein
at least a part of the housing is configured as the regenerative power discharge resistor, and the regenerative power discharge resistor comprises a resistive element disposed on at least one side wall of the housing in a curved zig-zagging pattern.

* * * * *